March 8, 1932.   C. S. BRAGG ET AL   1,848,414
BRAKE SYSTEM FOR AUTOMOTIVE VEHICLES
Filed July 7, 1930   2 Sheets-Sheet 1
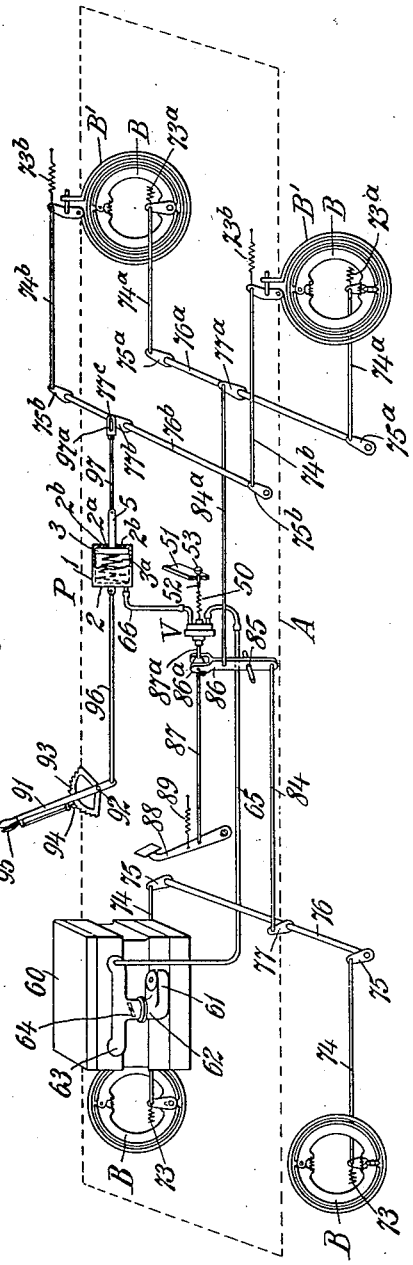
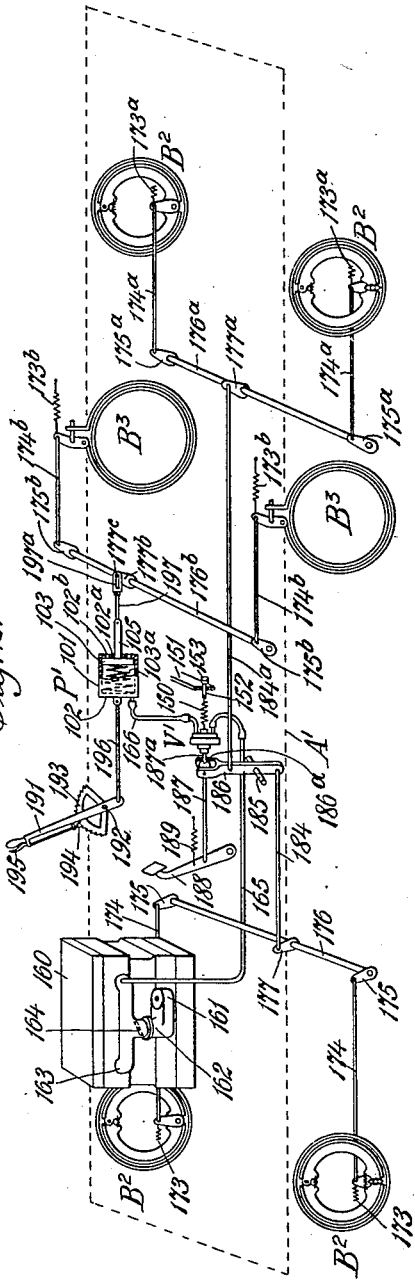
Caleb S. Bragg
Victor W. Kliesrath
INVENTORS
BY
M. W. McConkey
ATTORNEY

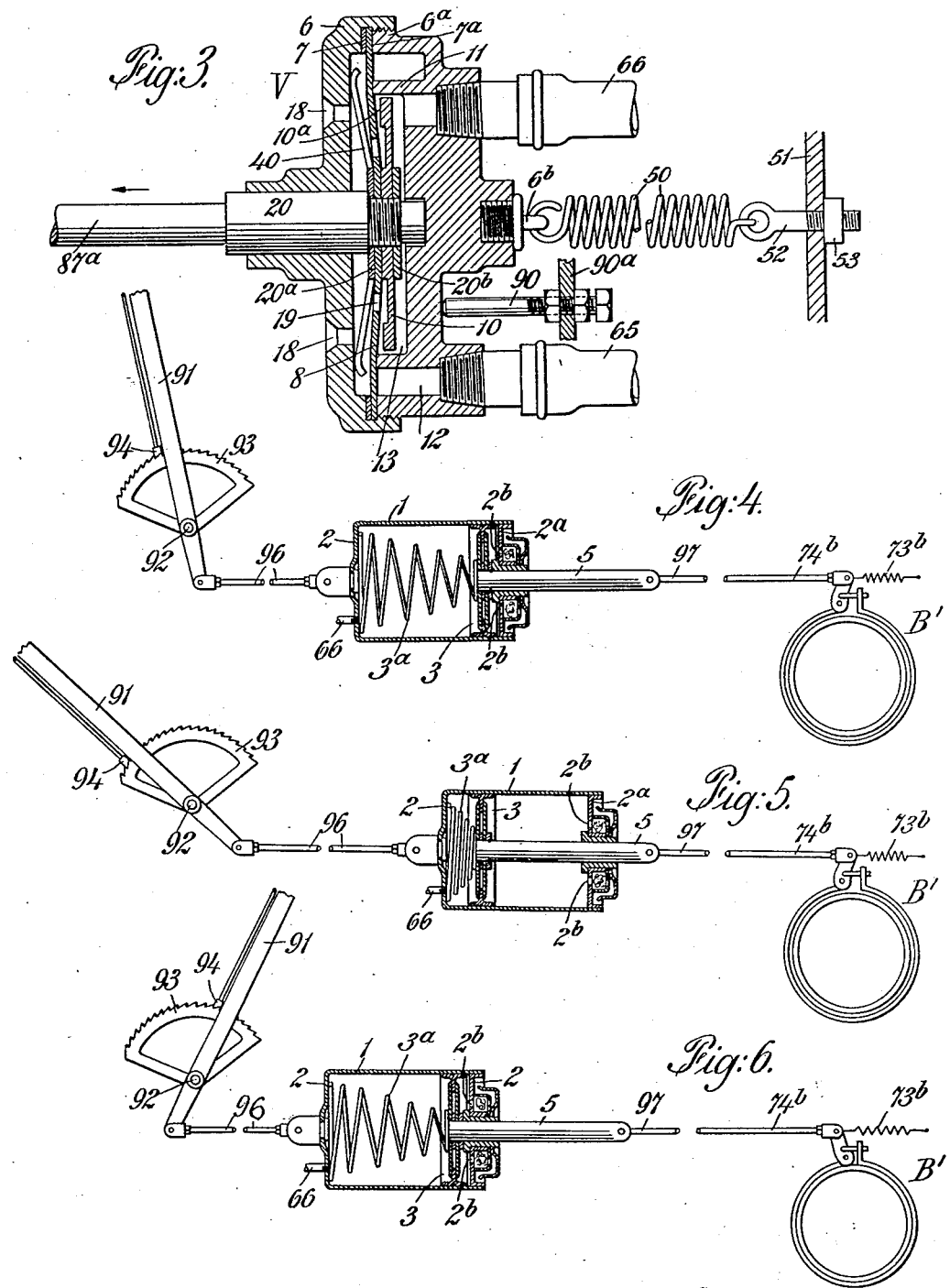

Patented Mar. 8, 1932

1,848,414

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed July 7, 1930. Serial No. 466,077.

Our invention consists in the novel features hereinafter described, reference being had to the accompanying drawings which represent several embodiments of the same selected by us for purposes of illustration, and the said invention is fully disclosed in the following description and claims.

Our invention is an improvement in vacuum brake systems for automotive vehicles, in which a power actuator operated by differentials of fluid pressures is employed. These differentials of fluid pressures are conveniently obtained by employing the atmospheric pressure, as the higher fluid pressure, acting against a partial vacuum, as the lower fluid pressure, obtained by a connection with the throttle controlled suction passage of the internal combustion engine which propels the vehicle. Such power actuators operate under the control of suitable valve mechanism, which in turn is operated by a physically operable part, usually the ordinary brake pedal, which is connected with certain of the brake mechanisms so as to permit the application of physical force thereto.

In the lighter and cheaper classes of automotive vehicles, and particularly trucks, they are ordinarily equipped with four wheel service brake mechanisms operated by the pedal lever and with an additional or emergency brake mechanism applicable in general practice to the rear wheels only, and operated by the emergency brake lever. In many instances the service brake mechanisms are not adequate for stopping the vehicle when carrying excessive loads or drawing trailers, or semi-trailers.

It is frequently found that the service brake mechanisms furnished on such vehicles are of such construction that it is impracticable to attempt to apply them with any greater amount of force than that by which they were intended to be operated, i. e., the physical force of the operator exerted through the pedal lever. In such case the connection of a power actuator with the service brake mechanisms is undesirable, as the force of the power actuator, especially where it is combined with the physical force of the operator, would tend to distort and injure the brake mechanisms, without materially increasing the efficiency of the braking system.

According to our present invention, in cases where additional braking by the operation of a foot brake pedal is desired, we locate a power actuator comprising a cylinder and piston in the brake rodding connecting the emergency brake lever to the emergency brake mechanisms, and operate the power actuator under the control of valve mechanism operatively connected with the foot pedal which operates the service brakes, so that the service brake mechanisms and the auxiliary or additional emergency brake mechanisms may be simultaneously applied by the operation of the foot pedal where greater braking is desired than can be obtained by the service brakes alone.

Our invention also comprises means whereby the maximum power with which the power actuator may apply the emergency brakes may be regulated and predetermined by the adjustment of the released position of the emergency brake lever, also the emergency brakes may be applied by the physical force of the operator through the emergency brake lever in the usual manner without operating the power actuator to lock the car when parked, or for other purposes.

Our invention also comprises the novel features of construction and combination of parts hereinafter described, and particularly pointed out in the claims.

Referring to the drawings,

Fig. 1 is a diagrammatic view representing a vacuum brake system embodying our invention installed in an automotive vehicle provided with four wheel service brake mechanisms, and emergency brake mechanisms for the rear wheels.

Fig. 2 is a similar diagrammatic view showing emergency brakes on the wheels not affected by the service brakes.

Fig. 3 is an enlarged sectional view of a controlling valve mechanism which we conveniently employ, and which is illustrated in Figs. 1 and 2.

Fig. 4 is a detail view, partly in section, of the emergency lever, the brake rodding therefrom to the emergency brake mechanisms, and the power actuator located in said rodding, the parts being shown in released position of the brakes, but for full power application by means of the emergency brake lever.

Fig. 5 shows the same parts with the emergency lever adjusted to reduce the amount of power which the power actuator may apply to the brake mechanism.

Fig. 6 is a similar view showing the same parts with the emergency lever in position to apply the emergency brakes by physical force.

Referring to Fig. 1 of the drawings, we have illustrated, at A, in dotted lines, an automotive vehicle provided with an internal combustion engine, 60, having the usual carburetor, 61, and suction passage comprising the vertical portion, 62, and intake manifold, 63, and provided with the usual throttle valve, 64, located between the carburetor and the manifold. In this instance the vehicle is shown provided with service brake mechanisms indicated at B, for four wheels, which are shown as being of the internal or expanding type. We have also shown additional brake mechanisms, in this instance the ordinary emergency brake mechanisms, indicated at B′, B′, for the rear wheels, which in this instance are shown as being of the external or contracting type. We desire it to be understood, however, that the invention is not limited to any particular type of brake mechanism or the particular means by which they are connected with the operating means therefor. 88 represents the usual brake pedal lever provided with a retracting spring, 89. The pedal lever is directly connected with the service brake mechanisms for operating them by physical force. In Fig. 1 we have shown the pedal lever, 88, connected by rod, 87, with lever, 86, pivoted at 85, to a fixed part connected with the chassis, the said lever being connected on opposite sides of its pivotal support with the front and rear wheel brake mechanisms in a well known way, so that when the pedal is depressed the service brake mechanisms will be applied with the desired degree of force determined by the operator. As shown, the lever, 86, is connected by link, 84, with an arm, 77, on a rock shaft, 76, provided with arms, 75, connected by link rod, 74, with the front wheel brake mechanisms, B, B. The lever, 86, is likewise connected by link rod, 84a, with an arm, 77a, on a rock shaft, 76a, provided with arms, 75a, connected by link rod, 74a, with the rear wheel service brake mechanisms, B, B. The emergency brake mechanisms, B′, B′, are connected by links, 74b, with arms, 75b, on a separate rock shaft, 76b, provided with an actuating arm, 77b.

P represents a power actuator comprising relatively movable members, in this instance a cylinder, 1, closed at one end by the head, 2, and provided with a movable piston, 3, which is constructed so as to engage the opposite head, 2a, of the cylinder, or parts connected therewith, in the released position. While our invention is not limited to any particular type of actuator, we have shown herein a power actuator of the pressure-balanced type, in which the opposite faces of the piston are exposed to atmospheric pressure when the parts are in the released position, and to this end the head, 2a, is provided with apertures, indicated at 2b, so that the outer face of the piston is at all times subjected to atmospheric pressure. The power actuator is interposed in the rodding connecting the emergency brake mechanisms with an emergency brake lever, indicated at 91, pivoted at 92, to a fixed portion of the chassis, and provided with means for locking it in different adjusted position. In this instance we have shown for this purpose the usual ratchet segment, 93, and locking pawl, 94, provided with the usual hand operated releasing lever, 95, connected therewith. The lower end of the emergency lever, 91, is connected by a link rod, 96, with one member of the actuator, as the cylinder, 1, and the other member of the actuator, as the piston, 3, has its piston rod, 5, connected with the arm, 77b, by a link rod, 97. Both members of the power actuator are, therefore, movable with respect to the vehicle and may be, as shown, supported entirely by the linkage connecting the emergency lever with the arm, 77b. As will be seen, the members of the power actuator constitute tension elements of this linkage, so that the emergency brake mechanisms, B¹, B¹, may be directly applied by physical force, by moving the upper end of the emergency lever, 91, rearwardly from its released position in the usual manner, without operating the power actuator. We also prefer to interpose a spring, indicated at 3a, between the actuator piston and the forward end or head, 2, of the cylinder, 1, to assist the retracting means for the emergency brake mechanisms, here indicated as spring, 73b, for returning the brake mechanisms, B′, and the piston, to released position.

The service brake mechanisms are also provided with suitable retracting means represented by the springs, 73 and 73a, for returning them to released position after they are actuated by the pedal lever. The emergency brake lever, 91, is shown in Fig. 1 in the released position of the brake shoes, and the emergency brake lever may be moved forwardly in the released position of the brake shoes and locked by the pawl, 94, in predetermined adjusted positions, for the purpose of limiting the stroke of the piston, 3, so as to adjust and predetermine the extent to which the emergency brake mechanisms, B′, B′, can be applied by the power of the actuator when called into operation as hereinafter described. Such forward movement of the emergency brake lever is accompanied by a movement of the cylinder with respect to the piston or a slotted connection may be employed at some point in the linkage. For example, in Fig. 1 the rear end of the link rod, 97, is shown provided with a slotted portion, 97a, engaging a pin, 77c, at the outer end of the arm 77b, but the particular location of such a slotted or lost motion connection, if employed, is immaterial.

V represents the controlling valve mechanism for the power actuator, P, which is operatively connected with the pedal lever, 88. We prefer to employ a valve mechanism having a "follow-up" operation, so that the power of the actuator may be applied gradually to the brake mechanisms operated thereby in proportion to the forward movement of the pedal lever and the power transmitted therethrough to the service brake mechanisms. Such a valve mechanism is herein shown and illustrated in Fig. 3, but the particular construction thereof forms no part of our present invention and will not be herein specifically claimed, as it forms the subject matter of our previous applications for Letters Patent of the U. S., filed November 7, 1927, Serial No. 231,724, and January 26, 1928, Serial No. 283,182. It will, however, be briefly described in order that our present invention may be clearly understood.

This valve mechanism, which is shown in released position in Fig. 3, comprises a hollow casing preferably formed of two members, 6 and 6ª, secured together, as by being threaded one upon the other, and provided with annular clamping portions, 7 and 7ª. The casing member, 6ª, is provided interiorly with an annular seat, 11, dividing the interior into an annular suction chamber, 12, and a central chamber, 13, said seat being adapted to be engaged by a diaphragm, 8, having its marginal portions in sealing engagement with the valve casing and preferably clamped between the annular portions, 7 and 7ª. The diaphragm, 8, is provided with apertures, 19, which are at all times in communication with the atmosphere through apertures, 18, in the casing member, 6. Within the chamber, 13, of the valve casing is a cup-shaped disc valve, 10, having an annular flange or seat, 10ª, for engaging the diaphragm upon its inner face to make a tight joint and close the air inlet apertures, 19, in the diaphragm. The disc valve and diaphragm are rigidly connected at their central portion with a valve actuating part, 20, movable with respect to the valve casing and extending through a central aperture in the casing member, 6. A spring, 40, in this instance in the form of a spider, is interposed between the casing member, 6, and the valve actuating part, 20, and tends to hold the diaphragm, 8, seated on the seat, 11, and the disc valve, 10, unseated from the diaphragm, as shown in Fig. 3 when the parts are in released position. In this instance the spring, diaphragm and disc valve are clamped between collars, 20a and 20b, on the valve actuating part, 20. Suitable means are provided to limit the movement of the valve actuating part, 20, in the direction of the arrow Fig. 3, with respect to the valve casing, and in this instance this function will be performed by the collar, 20a, engaging the inner face of the casing member, 6. The valve casing is provided with means, as an eye, 6b, connected with the casing member, 6a, for the attachment to the valve casing of one end of a resistance spring, 50, the other end of which is connected adjustably with a fixed part, indicated at 51, of the chassis. In this instance we have shown the rear end of the spring, 50, connected with an eye-bolt, 52, having a threaded portion extending through the fixed part, 51, and provided with an adjusting nut, 53, by which the initial tension of the spring may be calibrated. The valve actuating part, 20, is connected by the link rod, 87, with the pedal lever to the right of a pivotal connection, 86a, of the rod, 87, with the upper end of the lever, 86. The valve casing will therefore be supported by the portion, 87a of the link rod, 87, which projects to the rear of the pivotal connection, 86a, and is capable of bodily movement by the pedal lever.

The annular suction chamber, 12, of the valve casing is connected by a suction pipe, 65, with the suction passage of the engine between the throttle valve, 64, and the engine cylinders, in which portion of the suction passage a partial vacuum will exist when the engine is running and the throttle valve is closed or partly closed. The maximum rarefication ordinarily obtainable in this portion of the suction passage may be represented approximately by 20 inches of mercury in the vacuum gauge at sea level. The chamber, 13, of the valve mechanism is connected by a pipe, 66, with the actuator cylinder, 1, forward of the piston thereof. Portions at least of the pipe, 65 and 66, are made of flexible material to accommodate the movements of the valve mechanism and the power actuator with respect to each other and with respect to the chassis.

Assuming that the engine is running with the throttle valve closed, which is its normal position when the brakes are to be applied, rarefication will be produced in the suction passage of the engine and the air will be exhausted from the annular suction chamber, 12, which is disconnected from the cylinder, 1, of the actuator by the seating of diaphragm, 8. In this position of the valve mechanism the disc valve is unseated and air has access to the closed end of the actuator cylinder, and as the outer face of the piston, 3, is at all times exposed to atmosphere as well as the outer faces of the cylinder heads and the inner faces of the rear cylinder head, 2a, the fluid pressures on the piston and on the forward head of the cylinder are equalized, and the actuator may be said to be pressure balanced. If it is desired to apply the brake mechanisms of the vehicles, the operator will depress the pedal, 88, which immediately starts the application of the service brakes, B, B, B, B, connected directly therewith. This movement of the pedal lever will also draw the valve casing bodily forward in the direction of the arrow in Fig. 3, and will create or increase the tension of the spring, 50. As soon as the tension of spring, 50, is sufficient to overcome the resistance of the spring, 40, atmospheric valve, 10, will seat upon the diaphragm, shutting off the closed end of the actuator cylinder from the atmosphere, and when the tension of the spring, 50, overcomes the differential of fluid pressures on the portions of the diaphragm extending across the annular section, 12, the diaphragm, 8, will be unseated. This places the suction chamber, 12, in communication with the actuator cylinder through chamber, 13, and pipe, 66, and the exhaustion of the air from the closed end of the actuator cylinder will immediately begin, resulting in a differential of fluid pressures on the opposite faces of the piston, and a movement of the piston, 3, in a direction to apply the emergency brake mechanisms, B', B'. The cylinder is held from movement by the rod, 96, and the locked emergency lever, 91.

A corresponding degree of rarefication will exist in chamber, 13, and a corresponding differential of fluid pressures will be built up on the opposite faces of the diaphragm, 8, and disc, 10, acting in a direction opposite that indicated by the arrow in Fig. 3, which is transmitted to the operator's foot through the pedal lever, 88. At the same time a corresponding differential of fluid pressures will exist on the opposite faces of the area of the rear wall of the valve casing member, 6a, enclosing chamber, 13, acting in the direction of the arrow in Fig. 3, and tending to move the valve casing bodily forward in the direction of the arrow, and in opposition to the spring, 50. If the operator ceases to depress the pedal before the tension of the spring, 50, has been increased beyond the point where the maximum differential of fluid pressures upon opposite faces of the valve casing member, 6a, may overcome the resistance of the spring, 50, the valve casing will continue to move forward in the direction of the arrow, Fig. 3, with respect to the valve actuating part, 20, which remains stationary when the pedal movement is stopped, and seats the diaphragm 8, on the seat, 11, cutting off chamber, 13, and the cylinder from the suction chamber, 12. This will lock the vacuum thus far obtained within the portion of the actuator cylinder connected with the valve mechanism and hold the emergency brakes also, as applied. A further forward movement of the brake pedal lever, 88, will apply the service brakes, B, B, B, B, connected therewith, to a further extent, and will also, by carrying the valve casing bodily forward further increasing the tension of spring, 50, and again unseating the diaphragm, 8, apply the emergency brake mechanisms, B', B', B', B', to a further extent by the power of the actuator.

It will thus be seen that when the emergency lever is in the released position as shown in Fig. 1, the depression of the pedal will not only apply the service brakes, but will also simultaneously apply the emergency brake mechanisms, B', B', in addition thereto, and the application of both sets of brakes may be graduated as desired and entirely controlled by the operation of the pedal lever, without touching the emergency lever. This arrangement gives the operator increased braking represented by the emergency brakes, which is especially desirable when the vehicle is heavily laden, as the pay load is mostly carried by the rear wheels upon which the emergency brakes operate. In an emergency, after the service brakes have been applied to their fullest extent, and the emergency brakes have been applied by the full power of the actuator, the operator may still grasp the emergency lever, 91, and apply such additional physical force to the emergency brake mechanisms as remains after overcoming the power exerted thereon by the cylinder of the actuator.

To release the brakes the operator will release the pedal lever, which will permit the service brakes to immediately relieve themselves under the action of their retracting springs. The valve casing will also move rearwardly with the brake pedal, relieving the tension of spring, 50, and as soon as the tension of this spring has been reduced to a point where the compression of the spring, 40, and the differential of fluid pressures on the valve and diaphragm can overcome it, the valve actuating part, 20, will move forward with respect to the valve casing so as to first seat the diaphragm, 8, and then unseat the disc valve, 20, again connecting the actuator with atmosphere, and equalizing pressures on the piston, so as to enable the brakes, B', B', connected with the actuator to likewise release themselves and be returned, together with the piston, by their springs 73b, and the actuator spring, 3a, to normal position.

If no stop is provided for the valve casing, the compression of spring, 40, must be greater than the tension of the spring, 50, to hold the atmospheric valve open in the released position of the brakes connected with the pedal, 88.

In describing the operation of the apparatus in the preceding paragraphs, it has been assumed that the emergency brake lever is in the position which just releases the emergency brakes as indicated in Figs. 1 and 4. If it is not desired to use the power actuator and the emergency brake mechanisms, B', B', as, for example, when the vehicle is very lightly loaded and when the vehicle may be more efficiently retarded by applying the service brakes with more equal power to the four wheels of the vehicle, the operator can move the upper end of the emergency brake lever, 91, forwardly, as indicated in Fig. 5, reducing the distance the piston may travel to such an extent that the actuator piston will contact the head of the cylinder without applying any force to the emergency brake mechanisms. By adjusting the emergency brake lever, 91, at intermediate points between its extreme forward position and the released position shown in Figs. 1 and 4, the maximum amount of power which may be applied to the emergency brake mechanisms, when the pedal lever is operated to apply the service brake mechanisms, may be regulated as desired, in accordance with the load of the vehicle or the wishes of the operator. It will also be understood that, regardless of the position of the emergency lever forward of its normal released position, and regardless of whether or not the power actuator is in operation, a rearward pull on the upper end of the emergency lever will move the cylinder to the left, and when the rear end plate of the cylinder engages the piston, will apply the physical force of the operator directly to the emergency brake mechanisms, and the emergency brake mechanisms may be set when the car is parked, whether the engine is running or not in the usual manner, as indicated, for example, in Fig. 6, in which case the members of the actuator act as tension members in the linkage which connects the emergency brake lever with the emergency brake mechanisms.

In Fig. 1 the emergency brake mechanisms, B¹, B¹, are shown as applied to the rear wheels to which the rear wheel service brake mechanisms, B, B, are also applied. We desire it to be understood, however, that our invention is not limited to this construction, and that the brake mechanisms connected with the emergency brake lever and operable by a power actuator as well, in the manner previously described, may be applied to other wheels which are not effected by the service brake mechanisms. By way of example, we have illustrated such a construction in Fig. 2. In this figure, in which the parts corresponding with those shown in Fig. 1 are given the same reference numerals with the addition of 100 to avoid unnecessary repetition, the automotive vehicle indicated in dotted lines at A¹, is provided with four wheel service brake mechanisms, B², B², B², B², connected with and operated by the pedal lever, 188, in exactly the same manner as illustrated in Fig. 1. The automotive vehicle, indicated at A¹, is shown as provided with six wheels, and the emergency brake mechanisms, indicated at B³, B³, are applied to the intermediate wheels and operatively connected with the power actuator, P¹, and with the emergency lever, 191, in exactly the same manner as illustrated and previously described with reference to Fig. 1. The controlling valve mechanism for the actuator, indicated at V¹, is constructed and operates in the same manner as the valve mechanism shown in detail in Fig. 3.

In the installation illustrated in Fig. 2, when the emergency lever is in its normal released position as therein shown, the depression of the pedal lever will effect the application of the service brakes by physical force and at the same time operate the valve in the manner previously described, to apply the emergency brake mechanisms to the intermediate wheels, thus supplementing the action of the service brakes under the control of the pedal lever, by retarding wheels which support a part of the weight of the vehicle and which are not retarded by the service brakes, and this additional braking force can be brought into operation to a greater or less extent, or dispensed with altogether during the application of the service brakes as previously described, while the emergency brakes may be at any time applied to the intermediate wheels for parking or otherwise, by the physical force of the operator through the emergency lever, 191, no matter in what position it may be adjusted.

It will also be understood that by means of the adjustable eye-bolt shown best at 52 in Fig. 3, the initial adjustment of the spring, 50, may be varied. The more the initial tension of this spring is increased, the quicker the valve will be operated to effect the power stroke of the power actuator, with respect to the range of movement of the pedal lever, so that in any embodiment of the invention the application of the emergency brake mechanisms by power, when the emergency lever is in the normal released position, can be made to commence before the application of the service brake mechanisms, substantially simultaneously therewith, or after the service brake mechanisms have been applied to any desired and predetermined extent, while as before stated, the adjustment of the emergency brake lever, 91 (Fig. 1), or 191 (Fig. 2), will permit the operator to vary the maximum amount of power which the power actuator can exert on the emergency brakes when called into action. When the tension of the spring, 50, is stronger than the tension of the spring, 40, we provide a stop for the valve mechanism in order that the atmospheric valve may be held open by the tension of the retracting spring, 89, such a stop being shown, for example, at 90 in Fig. 3, supported in a part, 90a, having a fixed relation with the chassis.

What we claim and desire to secure by Letters Patent is:—

1. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator operatively connected with the first mentioned physically operable part.

2. In a brake system for automotive vehicles, the combination with service brake mechanisms and a service brake lever connected therewith for applying them by physical force, of independently operable emergency brake mechanisms, an emergency brake lever therefor, a fluid pressure operated power actuator having relatively movable members connected respectively with the emergency brake lever and with said emergency brake mechanisms, and controlling valve mechanism for said actuator operatively connected with the service brake lever.

3. In a brake system for automotive vehicles, the combination with brake mechanism, and a physically operable part connected to certain of said brake mechanisms only, for applying them by physical force, of a second physically operable part, a fluid pressure operated power actuator comprising members movable with respect to the vehicle and with respect to each other, and connected respectively with said second physically operable part and with other of said brake mechanisms, a controlling valve mechanism for said actuator operatively connected with said first mentioned physically operable part.

4. In a brake system for automotive vehicles, the combination with service brake mechanisms and a service brake lever connected therewith for applying them by physical force, of independently operable emergency brake mechanisms, an emergency brake lever therefor, a fluid pressure operated power actuator comprising a cylinder and a piston both movable with respect to the vehicle and movable with respect to each other, and connected respectively with said emergency brake lever and with said emergency brake mechanisms, said cylinder and piston forming tension elements in the connections between the emergency brake lever and brake mechanisms connected therewith, and controlling valve mechanism for said actuator operatively connected with the service brake lever.

5. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator operatively connected with the first mentioned physically operable part, and means for varying the brake released position of said second mentioned physically operable part, to vary the amount of power exerted by the actuator when the brake mechanism is connected therewith.

6. In a brake system for automotive vehicles, the combination with service brake mechanisms and a service brake lever connected therewith for applying them by physical force, of independently operable emergency brake mechanisms, an emergency brake lever therefor, a fluid pressure operated power actuator having relatively movable members connected respectively with the emergency brake lever and with said emergency brake mechanisms, and controlling valve mechanism for said actuator operatively connected with the service brake lever, and means for locking the emergency brake lever in different released positions, to regulate the amount of power applied by the actuator to the emergency brakes under the control of said valve mechanism.

7. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to differentials of fluid pressures corresponding with those to which the power actuator is subjected during a power stroke thereof, one of said relatively movable parts of the valve mechanism being operatively connected with the first mentioned physically operable part.

8. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts, a resistance spring for said valve mechanism connected with the vehicle, the relatively movable parts of said valve mechanism being connected respectively with the first mentioned physically operable part and with said spring.

9. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to the differentials of fluid pressures existing in the actuator during a power stroke thereof and exerted in a direction to return said valve mechanism toward released position, a resistance spring for said valve mechanism connected to a fixed point on the vehicle, the relatively movable parts of said valve mechanism being connected respectively with the first mentioned physically operable part and with said resistance spring.

10. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts, a resistance spring for said valve mechanism connected with the vehicle, the relatively movable parts of said valve mechanism being connected respectively with the first mentioned physically operable part and with said spring, and adjusting means for varying the tension of said spring.

11. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to the differentials of fluid pressures existing in the actuator during a power stroke thereof and exerted in a direction to return said valve mechanism toward released position, a resistance spring for said valve mechanism connected to a fixed point on the vehicle, the relatively movable parts of said valve mechanism being connected respectively with the first mentioned physically operable part and with said resistance spring, and means for varying the tension of said spring.

12. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to differentials of fluid pressures corresponding with those to which the power actuator is subjected during a power stroke thereof, one of said relatively movable parts of the valve mechanism being operatively connected with the first mentioned physically operable part, and means for holding the second mentioned physically operable part in different brake released positions, to vary the amount of power exerted by the actuator on the brake mechanisms connected therewith.

13. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts, a resistance spring for said valve mechanism connected with the vehicle, the relatively movable parts of said valve mechanism being connected respectively with the first mentioned physically operable part and with said spring, and means for holding the second mentioned physically operable part in different brake released positions, to vary the amount of power exerted by the actuator on the brake mechanisms connected therewith.

14. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to the differentials of fluid pressures existing in the actuator during a power stroke thereof and exerted in a direction to return said valve mechanism toward released position, a resistance spring for said valve mechanism connected to a fixed point on the vehicle, the relatively movable parts of said valve mechanism being connected respectively with the first mention physically operable part and with said resistance spring, and means for holding the second mentioned physically operable part in different brake released positions, to vary the amount of power exerted by the actuator on the brake mechanisms connected therewith.

15. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts, a resistance spring for said valve mechanism connected with the vehicle, the relatively movable parts of said valve mechanism being connected respectively with the first mentioned physically operable part and with said spring, and adjusting means for varying the tension of said spring, and means for holding the second mentioned physically operable part in different brake released positions, to vary the amount of power exerted by the actuator on the brake mechanisms connected therewith.

16. In a brake system for automotive vehicles, the combination with brake mechanism, and a physically operable part connected to certain of said brake mechanisms only, for applying them by physical force, of a second physically operable part, connections extending therefrom to other of said brake mechanisms, a fluid pressure operated power actuator interposed in said connections and forming tension elements thereof, and a controlling valve mechanism for said actuator movable bodily with respect to the vehicle, comprising relatively movable parts subjected to the differentials of fluid pressures existing in the actuator during a power stroke thereof and exerted in a direction to return said valve mechanism toward released position, a resistance spring for said valve mechanism connected to a fixed point on the vehicle, the relatively movable parts of said valve mechanism being connected respectively with the first mentioned physically operable part and with said resistance spring, and means for varying the tension of said spring, and means for holding the second mentioned physically operable part in different brake released positions, to vary the amount of power exerted by the actuator on the brake mechanisms connected therewith.

In testimony whereof we affix our signatures.

CALEB S. BRAGG.
VICTOR W. KLIESRATH.